United States Patent
Bernier

(10) Patent No.: US 9,563,677 B2
(45) Date of Patent: Feb. 7, 2017

(54) SYSTEMS AND METHODS FOR CLUSTERED MATCHING OF RECORDS USING GEOGRAPHIC PROXIMITY

(71) Applicant: Melissa Data Corp., Rancho Santa Margarita, CA (US)

(72) Inventor: Marc Bernier, Scituate, MA (US)

(73) Assignee: Melissa Data Corp., Rancho Santa Margarita, CA (US)

( * ) Notice: Subject to any disclaimer, the term of this patent is extended or adjusted under 35 U.S.C. 154(b) by 220 days.

(21) Appl. No.: 14/103,502

(22) Filed: Dec. 11, 2013

(65) Prior Publication Data

US 2014/0164420 A1    Jun. 12, 2014

Related U.S. Application Data

(60) Provisional application No. 61/735,636, filed on Dec. 11, 2012.

(51) Int. Cl.
  *G06F 17/30* (2006.01)
  *G06Q 10/02* (2012.01)

(52) U.S. Cl.
  CPC ......... *G06F 17/30557* (2013.01); *G06Q 10/02* (2013.01)

(58) Field of Classification Search
  CPC .............................................. G06F 17/30864
  See application file for complete search history.

(56) References Cited

U.S. PATENT DOCUMENTS

| | | | |
|---|---|---|---|
| 5,303,149 A | 4/1994 | Janigian | |
| 5,799,302 A | 8/1998 | Johnson et al. | |
| 6,374,241 B1 | 4/2002 | Lamburt et al. | |
| 8,046,372 B1 | 10/2011 | Thirumalai et al. | |
| 8,244,851 B1 * | 8/2012 | Postoaca | G06Q 50/01 709/205 |
| 8,554,742 B2 | 10/2013 | Nayemi-Rad et al. | |
| 9,002,380 B2 * | 4/2015 | Sabatelli | H04W 4/023 455/456.1 |
| 2005/0273452 A1 | 12/2005 | Molloy et al. | |
| 2006/0230032 A1 * | 10/2006 | Brankov | G06F 17/30424 |
| 2009/0131028 A1 * | 5/2009 | Horodezky | H04M 1/274516 455/418 |
| 2010/0057732 A1 * | 3/2010 | O'Sullivan | G06Q 10/107 707/E17.109 |
| 2011/0034156 A1 * | 2/2011 | Gatti | H04M 1/2745 455/415 |
| 2012/0059853 A1 | 3/2012 | Jagota | |
| 2012/0209853 A1 | 8/2012 | Desai et al. | |
| 2012/0290597 A1 | 11/2012 | Henzinger | |
| 2012/0296903 A1 | 11/2012 | Khan et al. | |
| 2013/0144847 A1 | 6/2013 | Spurlock | |

FOREIGN PATENT DOCUMENTS

| GH | WO0034897 | * | 6/2000 | ............. G06F 17/30 |
|---|---|---|---|---|
| WO | 00/34897 | | 6/2000 | |
| WO | 2009/132263 | | 10/2009 | |

* cited by examiner

*Primary Examiner* — Hosain Alam
*Assistant Examiner* — Tuan-Khanh Phan
(74) *Attorney, Agent, or Firm* — Fish & Tsang LLP

(57) ABSTRACT

Systems and methods are provided for cluster matching of contact objects. First and second sub graphs can be generated that include respective first and second subsets of the plurality of contact objects. The sub graphs can be intersected to generate an intersecting set of contact object, which can then be analyzed using one or more processes to determine whether matching objects exist in the intersecting set.

13 Claims, 3 Drawing Sheets

SYSTEMS AND METHODS FOR CLUSTERED MATCHING OF RECORDS USING GEOGRAPHIC PROXIMITY

This application claims priority to U.S. Provisional Application No. 61/735,636 filed on Dec. 11, 2012. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling

FIELD OF THE INVENTION

The field of the invention is data processing, and specifically data processing systems and methods for matching records.

BACKGROUND

The following description includes information that may be useful in understanding the present invention. It is not an admission that any of the information provided herein is prior art or relevant to the presently claimed invention, or that any publication specifically or implicitly referenced is prior art.

It is a common goal for data processors to remove duplicate records from a database of records (e.g., customers' contact information), as duplicate records provide inaccurate information, and can result in wasted mailing costs and customer dissatisfaction.

In the past, duplicate records were uncovered using a "brute force" algorithm, where each record is compared to every other record in a database. For example, a database having ten records would require 45 comparisons. Adding an additional record to the database would require ten additional comparisons, and adding another record would require eleven additional comparisons, and so forth. This can be approximated in big O notation as:

$$O\left(\frac{n^2}{2}\right)$$

That is, for an input of n records, the time required for processing is proportional to $n^2$. Although comparisons can be done very quickly with today's computers, the sheer number of comparisons required even for small databases (e.g., one million records) can easily exceed practical time spans.

Because of the breadth of the data often contained in a record, it is common practice to use only a subset of a database's fields. Common field types used for matching include: first name, last name, street address, phone number, company, and so forth. In addition, to reduce the amount of processing time required, it is known to first create subsets of records that share a certain attribute. For example, a database of records could be divided by the first digit of each record's zip code, creating 10 subsets. Each record in a subset is then compared to every other record in that subset using a "brute force" algorithm. For a database with m evenly-sized clusters, processing speed is reduced:

$$O\left(\frac{n^2}{m}\right)$$

For large values of m, the time savings can be very significant. Although this process reduces processing time, the process is incomplete because records in one subset are not compared with records in other subsets. Thus, if a record in subset A were to match another record in subset B, the match would not be found.

Others have made efforts in the past to create methods of eliminating duplicated items in a database. U.S. Pat. No. 5,303,149 to Janigian, U.S. Pat. No. 5,799,302 to Johnson et al., U.S. Patent Publ. No. 2012/0290597 to Henzinger (publ. November 2012), and U.S. Patent Publ. No. 2013/0144847 to Spurlock (publ. June 2013) all incorporate the use of two different criteria to arrive at a final set of duplicated items. However, in these documents, a first criterion is applied to create a first subset, and then a second criterion is applied to the first subset to further narrow the first subset.

Additionally, U.S. Patent Publ. No. 2012/0296903 to Khan et al. (publ. November 2012) describes brute force comparison of items to check for duplication. Such a process, as described above, requires the checking of each item against every single other item, and is impractical for large numbers of records.

Various other processes of detecting duplicate records are described in the art. See, e.g., U.S. Pat. No. 6,374,241 to Lamburt et al.; U.S. Patent Publ. No. 2005/0273452 to Molloy, et al. (publ. December 2005); U.S. Patent Publ. No. 2012/0059853 (publ. March 2012); WIPO Publ. No. 00/34897 to Bloodhound Software, Inc. (publ. June 2000); and WIPO Publ. No. 2009/132263 to Lexis-Nexis Risk & Information Analytics Group, Inc. (publ. October 2009); U.S. Pat. No. 5,303,149 to Janigian; U.S. Pat. No. 5,799,302 to Johnson et al.; U.S. Pat. No. 8,554,742 Naeymi-Rad et al.; U.S. Patent Publ. No. 2013/0144847 to Spurlock (publ. June 2013); U.S. Patent Publ. No. 2012/0209853 to Desai et al. (publ. August 2012); U.S. Patent Publ. No. 2012/0296903 to Khan et al. (publ. November 2012); U.S. Patent Publ. No. 2012/0290597 to Henzinger (publ. November 2012); U.S. Pat. No. 8,046,372 to Thirumalai et al. However, all the processes known to Applicants are also incomplete and fail to appreciate the creation of intersecting sets to reduce the number of comparisons required to identify duplicate records.

These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Thus, there is still a need for improved systems and methods for clustered matching of records.

SUMMARY OF THE INVENTION

The inventive subject matter provides apparatus, systems and methods in which one can match contact records in one or more contact databases using clustering. The one or more contact databases can collectively include a plurality of contact objects, which can each have a set of attributes.

To determine whether duplicates exist among the plurality of contact objects, first and second sub graphs or groups of contact objects can be generated using the matching engine, preferably based on at least first and second criteria, respectively. The contact objects in the first and second subgraphs can then be compared to produce an intersecting set of objects.

To determine if matches exist in the intersecting set of objects, a number of methods could be used. For example, the contact objects of the intersecting set could be matched using a brute force process in which each contact object of the intersecting set can be compared with every other object of the intersecting set to determine if a match exists. More refined methods could alternatively be used including, for example, matching contact objects in the intersecting set based on geographical proximity.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

Various objects, features, aspects and advantages of the inventive subject matter will become more apparent from the following detailed description of preferred embodiments, along with the accompanying drawing figures in which like numerals represent like components.

DETAILED DESCRIPTION

It should be noted that while the following description is drawn to a computer/server based data processing system, various alternative configurations are also deemed suitable and may employ various computing devices including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). For example, a server can include one or more computers operating as a web server, database server, or other type of computer server in a manner to fulfill described roles, responsibilities, or functions. The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

One should appreciate that the disclosed techniques provide many advantageous technical effects including increasing the efficiency of data processing of one or more database to identify matches among the records in the one or more databases. By using geographical proximity and cluster matching, records can be matched that have non-identical fields, and that might otherwise have been missed by conventional processes.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1:
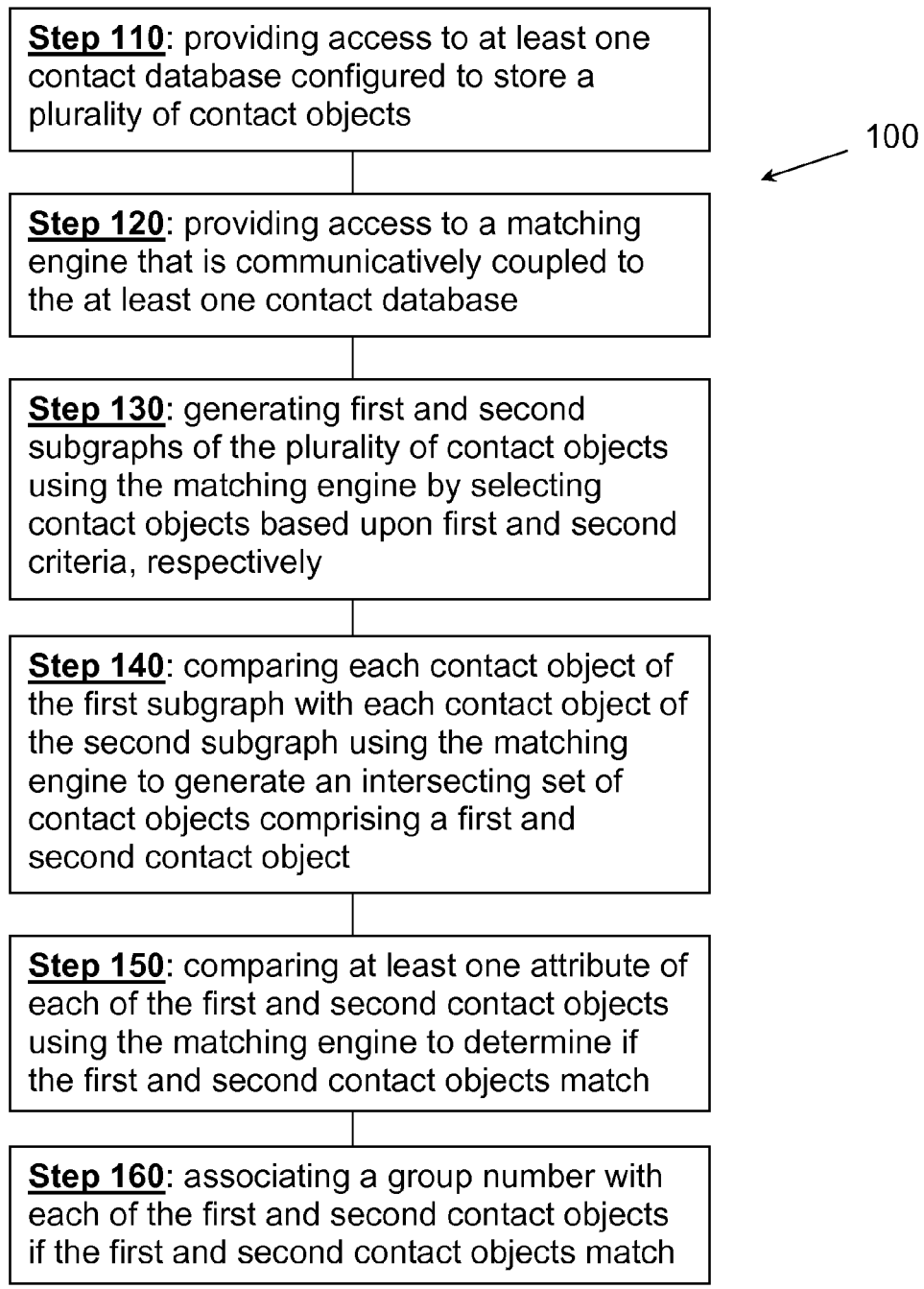
FIG. 1 is a chart of one embodiment of a method for matching records in a database.

In FIG. 1, an embodiment of a method 100 for cluster matching of contact objects in a database is shown. Method 100 preferably includes step 110 of providing access to at least one contact database configured to store a plurality of contact objects. Each of the contact objects can have a set of associated attributes.

The method 100 can further include step 120 of providing access to a matching engine that is communicatively coupled to the at least one contact database. The matching engine can advantageously be used to match contact objects within or among one or more databases and thereby uncover duplicate objects. In its simplest form, the plurality of records can be matched by comparing each record in the one or more databases with every other record in the one or more databases. Although there are optimizations to this process that can be applied, the following discussion is based on this simplification.

Each of the contact objects can have various attributes including, for example, a last name, a first name, location information (e.g., city/state/zip and/or geographical coordinates), a phone number, an email address, contact preferences, and so forth. Because of the breadth of data often associated with each record, it is common practice to use only a subset of a database's fields. Common field types used for matching include, for example, a first name, a last name, a street address, a phone number, a company name, and so forth.

A user can specify the conditions of determining whether records match by defining a set of matching rules, such as by using a matching interface. For example, a user might define the matching rules to include the parameters "first name," "last name," and "city." In another example, the user might define the matching rules to include the parameters "phone number," and "last name." In still another example, the user might instead define the matching rules to include the parameters "company name," "city," and "last name." Commercial software could also be used to define the matching rules. For example, Melissa DATA™'s MatchUP Object™ allows a user to specify up to 16 rules that are evaluated simultaneously. Rules are defined prior to processing and generally do not change during processing.

Using the matching engine, first and second sub graphs or groups of contact objects can be generated in step 130 based upon first and second criteria that each contains one or more of the plurality of contact objects. A user preferably provides the first and second criteria but alternatively they could be chosen by the software. Exemplary criteria include a first name, a last name, a category, and name variations, although any desired criterion could be used.

In preferred embodiments, the first and second subgraphs can have overlapping sets of contact objects, but it is also contemplates that the first subgraph could have an entirely distinct set of contact objects than that of the second sub graphs. Having overlapping sets of contact objects means that at least one of the contact objects within one of the contact sets shares some value in common or approximately in common with at least one of the contact objects from another set. Although method 100 is simplified to only refer to first and second subgraphs, one of ordinary skill in the art would understand that the method could have a three or more subgraphs.

In step 130, the matching engine can compare each contact object of the first subgraph with each contact object of the second subgraph to generate an intersecting set of contact objects that preferably includes at least a first and second contact object. It is further contemplated that the matching engine or other component could distill the contact objects within a subgraph prior to generating the one or more intersecting sets to thereby combine objects that are likely similar. For example, the names John and Jon could be combined, or addresses such as "103 N. First St." and "103 N. First." The determination concerning what attributes to combine will depend on the algorithms utilized and how strict of a comparison is desired.

The contact objects of the intersecting set can then be compared in step 140 to determine if there are matches within the intersecting set. Such comparison can utilize any number of commercially suitable processes including, for example, brute force matching, matching via geographical proximity, and so forth. It is contemplated that the matching engine could stop searching for additional matches to the objects assigned a group identifier once an initial match is found between those objects. A group identifier can be a letter, number, symbol, or color or any combination of letters, numbers, symbols, or colors that can be recognized as indicating a group containing matching objects. However, such an approach could possibly result in missed matches.

Where geographical proximity matching is used, it is contemplated that the first and second contact objects of the intersecting set will have respective first and second location attributes. These location attributes can then be compared in optional step 150 using the matching engine to determine a geographical distance between the first and second location attributes. In some contemplated embodiments, the distance between the first and second contact objects can be determined by calculating the great circle distance between the objects. The great circle distance is calculated using the spherical law of cosines, as shown in the following formula:

$$D=R*(\arccos(\sin latitude_1 * \sin latitude_2 + \cos latitude_1 * \cos latitude_2 * \cos(longitude_1 - longitude_2))$$

where D is distance, $latitude_1$ and $longitude_1$ are the coordinates associated with a first record, $latitude_2$ and $longitude_2$ are coordinates associated with a second record, and R is the radius of the Earth (approx. 1794 miles (2887 kilometers)). Of course, other distance measurements could be used, such as approximating the earth to have zero curvature and implementing the Pythagorean Theorem, without departing from the scope of the inventive subject matter described herein.

If the geographical distance between the first and second contact objects is calculated to be less than a threshold distance, a group identifier can be assigned or otherwise associated with each of the first and second contact objects in step 160. The threshold distance is preferably user defined prior to initiating the matching process. Contemplated threshold distances include, for example, 1 mile (1.609 kilometers), 5 mile (8.047 kilometers), 10 miles (16.09 kilometers), 15 miles (24.14 kilometers), 20 miles (32.19 kilometers), and so forth, although it is further contemplated that the user could manually input a threshold distance different from these distances.

Figure 2:
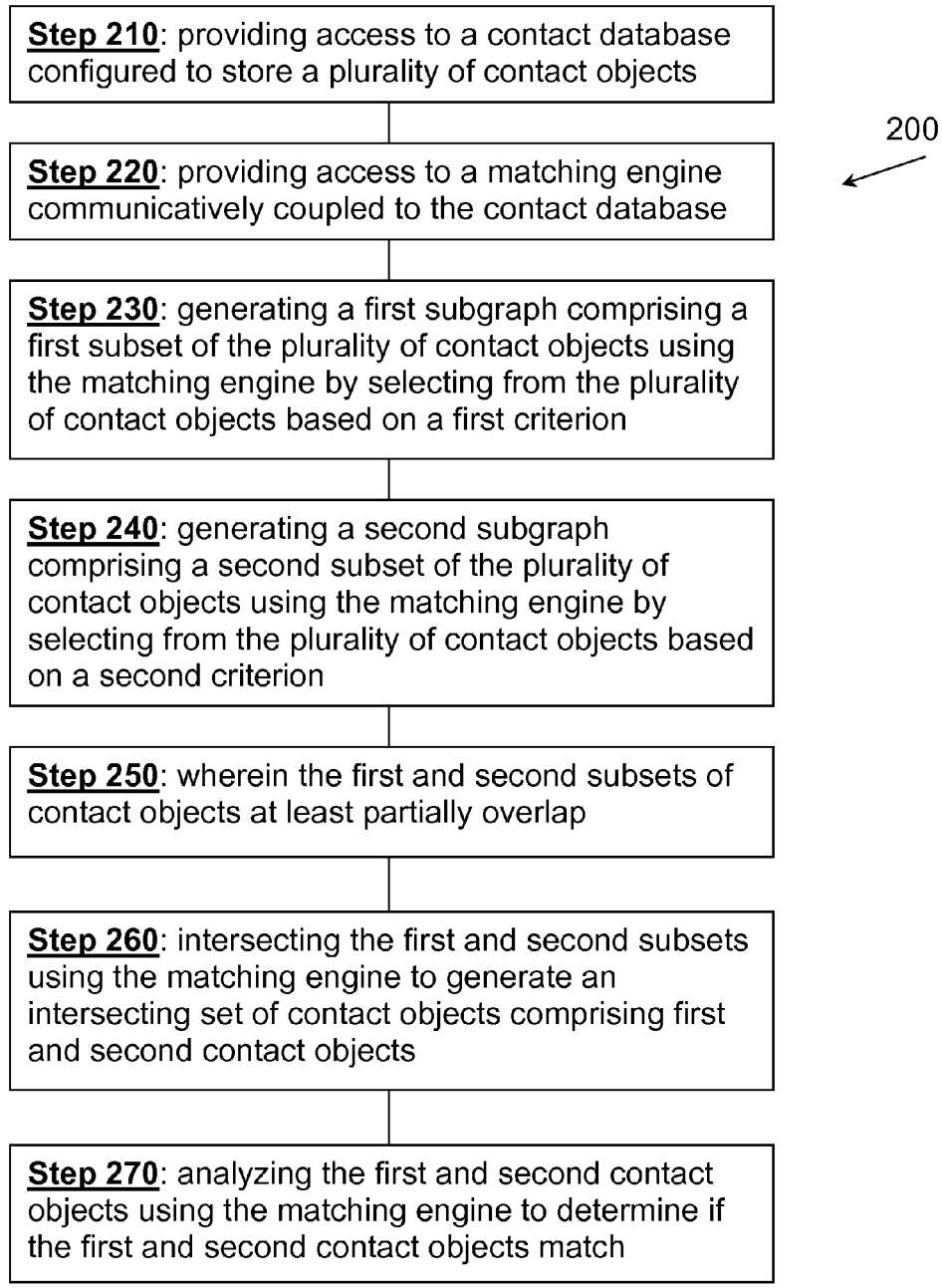
FIG. 2 is a chart of another embodiment of a method for matching records in a database.

FIG. 2 illustrates another embodiment of a method 200 for clustered matching of contact objects. The method 200 preferably includes step 210 of providing access to a contact database configured to store a plurality of contact objects. As discussed above, each of the contact objects can have a set of attributes. In step 220, access can also be provided to a matching engine communicatively coupled to the contact database. The matching engine can advantageously be used to match contact objects within or among one or more databases and thereby uncover duplicate objects.

A first subgraph can be generated in step 230 using the matching engine by selecting from the plurality of contact objects based on a first criterion, where the first subgraph includes a first subset of the plurality of contact objects. The first criterion could comprise, for example, a first name, a last name, a category, or name variations, although any desired criterion could be used.

Using the matching engine, a second subgraph can also be generated in step 240 by selecting from the plurality of contact objects based on a second criterion, such that the second subgraph comprises a second subset of the plurality of contact objects. Preferably, in step 250, the first and second subsets of contact objects at least partially overlap.

With the first and second subgraphs generated, the first and second subsets of the subgraphs can be intersected in step 260 using the matching engine to generate an intersecting set of contact objects comprising first and second contact objects.

In step 270, the first and second contact objects from the intersecting set can then be analyzed using the matching engine to determine if the first and second contact objects match. Such analysis could include a geographical comparison of the contacts, such as that described in U.S. provisional appl. having Ser. No. 61/658,498, entitled "Systems and Methods for Matching Records Using Geographic Proximity" filed on Jun. 12, 2012. However, other commercially suitable processes could alternatively be used for identifying matches of contact objects with the intersecting set of contact objects.

Figure 3:
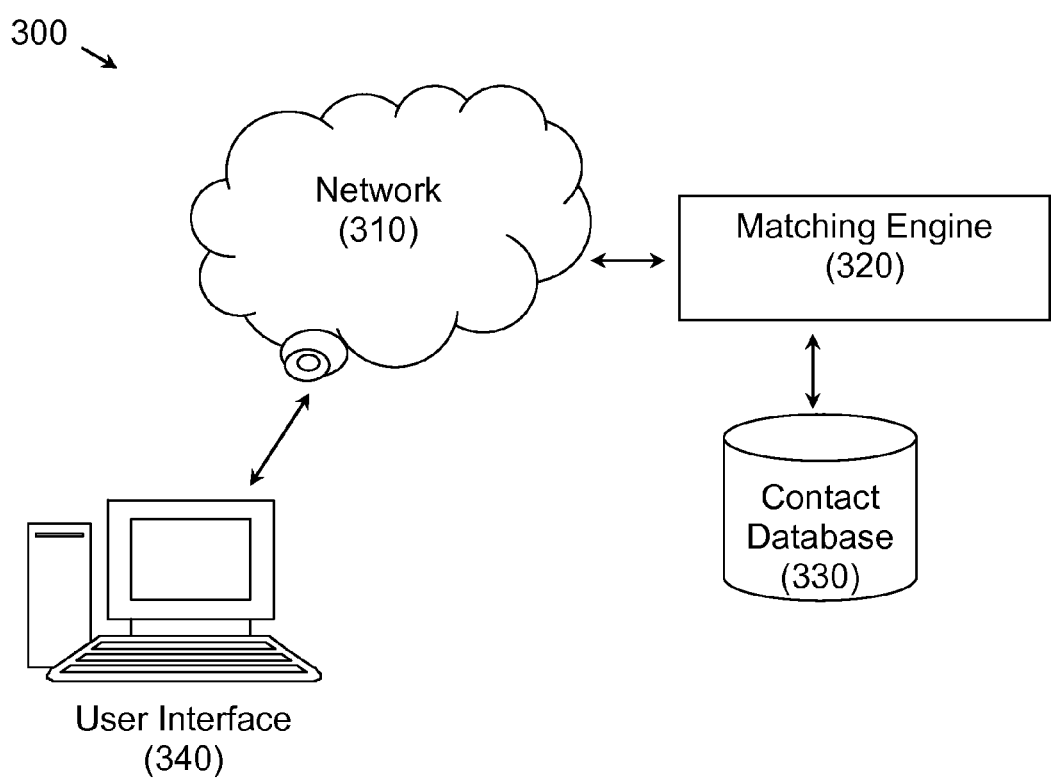
FIG. 3 is a diagram of one embodiment of a system for matching records in a database.

FIG. 3 illustrates an embodiment of a system 300 configured to match contact objects in a database using geographical proximity. The system 300 can include a contact database 330 configured to store a plurality of contact objects, and a user interface 340 configured to allow a user to choose first and second criterion.

A matching engine 320 can be communicatively coupled to the contact database 330. In this manner, the matching engine 320 can preferably be configured to (a) generate first and second subgraphs of the plurality of contact objects based on the first and second criterion, respectively, (b) intersect the first and second subgraphs to generate an intersecting set of contact objects comprising first and second contact objects, (c) compare the contact objects of the intersecting set to determine whether one or more duplicates exist, and (d) identifying the duplicate contact objects of the intersecting set.

EXAMPLE

The following discussion is based on the below data set:

| # | First Name | Last Name | Address | City | State | Latitude | Longitude |
|---|---|---|---|---|---|---|---|
| 1. | John | Smith | 82 Salem St | Boston | MA | 42.36371 | −71.055833 |
| 2. | Jon | Smith | 36 High St | Boston | MA | 42.354136 | −71.055231 |
| 3. | Bob | Smith | 1634 Beacon St | Brookline | MA | 42.33955 | −71.135625 |
| 4. | Robert | Johhnson | 390 Needham St | Newton | MA | 42.307091 | −71.216475 |
| 5. | Mary | Jones | 145 Central St | Wellesley | MA | 42.300192 | −71.266785 |
| 6. | Mary | Jones | 9 Worcester St | Natick | MA | 42.304363 | −71.326819 |

Step 1: Subgraph Creation

In this example, two subgraphs are created, one using the criterion "first name," and the other using the criterion "last name." The first subgraph will consist of:

| First Name | Record(s) |
|---|---|
| John | 1 |
| Jon | 2 |
| Bob | 3 |
| Robert | 4 |
| Mary | 5, 6 |

The second subgraph will consist of:

| Last Name | Record(s) |
|---|---|
| Smith | 1, 2, 3 |
| Johnson | 4 |
| Jones | 5, 6 |

Step 2: Subgraph Distillation

During subgraph distillation, any matching entries within each subgraph are combined. The rules governing distillation are preferably set by the user. In this example, we will assume that the user elected to match nicknames. Our 'First Name' subgraph is distilled to the following:

| First Name | Record(s) |
|---|---|
| John/Jon | 1, 2 |
| Bob/Robert | 3, 4 |
| Mary | 5, 6 |

Step 3: Subgraph Intersection

In the subgraph intersection step, each entry in the 'First Name' subgraph is compared to each entry in the 'Last Name' subgraph, and the two record lists are then intersected to yield an intersecting set comprised of records that from both sub graphs.

| John/Jon | 1, 2 |
|---|---|
| Smith | 1, 2, 3 |
| Intersection | 1, 2 (set 1) |

| Bob/Robert | 3, 4 |
|---|---|
| Smith | 1, 2, 3 |
| Intersection | 3 |

| Mary | 5, 6 |
|---|---|
| Smith | 1, 2, 3 |
| Intersection | none |

| John/Jon | 1, 2 |
|---|---|
| Johnson | 4 |
| Intersection | none |

| Bob/Robert | 3, 4 |
|---|---|
| Johnson | 4 |
| Intersection | 4 |

| Mary | 5, 6 |
|---|---|
| Johnson | 4 |
| Intersection | none |
| John/Jon | 1, 2 |
| Jones | 5, 6 |
| Intersection | none |

| Bob/Robert | 3, 4 |
|---|---|
| Jones | 5, 6 |
| Intersection | none |

| Mary | 5, 6 |
|---|---|
| Jones | 5, 6 |
| Intersection | 5, 6 (set 2) |

Intersecting sets that result in a null set are discarded. Intersecting sets that result in a single record are processed, and the single record is assigned a "unique" status. A unique status identifier can be a letter, number, color, or symbol or a combination of letters, numbers, colors or symbols that can be recognized as indicating uniqueness of a record.

Step 4: Brute Force Matching

Each intersecting set that result in more than one record (sets 1 and 2 above) are matched using a brute force algorithm or other commercially suitable process. As the intersecting sets are typically very small, the number of comparisons required is greatly reduced from prior art methods. In this example, only two subgraph intersecting sets need to be matched:

Set 1:

| # | First Name | Last Name | Address | City | State | Latitude | Longitude |
|---|---|---|---|---|---|---|---|
| 1. | John | Smith | 82 Salem St | Boston | MA | 42.36371 | −71.055833 |
| 2. | Jon | Smith | 36 High St | Boston | MA | 42.354136 | −71.055231 |

Set 2:

| # | First Name | Last Name | Address | City | State | Latitude | Longitude |
|---|---|---|---|---|---|---|---|
| 5. | Mary | Jones | 145 Central St | Wellesley | MA | 42.300192 | −71.266785 |
| 6. | Mary | Jones | 9 Worcester St | Natick | MA | 42.304363 | −71.326819 |

The latitude and longitude of the objects can be compared to determine the geographic proximity of the objects with respect to each other. For example, the two records in set 1 are found to be only 0.662 miles (1.065 km) apart, and thus are considered to be matching. Because this distance is less than the threshold distance of 5 miles (8.047 kilometers), the objects are considered to be matching and are each associated with a first group identifier. The two records in set 2 are found to be 3.089 miles (4.971 km) apart, also considered to be matching.

Although the contact objects of the intersecting set were compared using geographical proximity in this example, it is contemplated that the comparison of the objects could use any commercially suitable process or processes.

Step 5: Dupe Group Merging

In some cases, there can be situations where a single record was found to be matching other records in two different intersecting sets. In these cases, the two sets of matching records are merged into a single group of matching records.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method for clustered matching of contact objects in a database, comprising:
    providing access to at least one contact database configured to store a plurality of contact objects;
    providing access to a matching engine that is communicatively coupled to the at least one contact database;
    generating a first subgraph of the plurality of contact objects using the matching engine by selecting contact objects based upon a first criterion;
    generating a second subgraph of the plurality of contact objects using the matching engine by selecting contact objects based upon a second criterion;
    comparing each contact object of the first subgraph with each contact object of the second subgraph using the matching engine to generate an intersecting set of contact objects comprising first and second contact objects;

comparing at least one attribute of each of the first and second contact objects from the intersecting set using the matching engine to determine if the first and second contact objects match;

associating a group identifier with each of the first and second contact objects from the intersecting set if the first and second contact objects match; and deleting the second contact object from the at least one contact database if the second contact object matches the first contact object.

2. The method of claim 1, wherein the second subgraph comprises at least one contact object associated with the first subgraph.

3. The method of claim 1, wherein the first criterion is a first name, and the second criterion is a surname.

4. The method of claim 1, wherein the first criterion comprises a category.

5. The method of claim 1, further comprising combining at least some of the contact objects in the first subgraph using the matching engine based on a third criterion.

6. The method of claim 5, wherein the third criterion comprises name variations.

7. The method of claim 1, wherein the step of comparing at least one attribute of the first and second contact objects from the intersecting set further comprises comparing first and second location attributes of the first and second contact objects, respectively, using the matching engine to determine a geographical distance between the first and second location attributes, and wherein the step of associating further comprises associating the group identifier with the first and second contact objects if the geographical distance is less than a threshold distance.

8. The method of claim 7, wherein the threshold distance is at least five miles.

9. A method for clustered matching of contact objects in a database using geographical proximity, comprising:

providing access to a contact database configured to store a plurality of contact objects;

providing access to a matching engine communicatively coupled to the contact database;

generating a first subgraph comprising a first subset of the plurality of contact objects using the matching engine by selecting from the plurality of contact objects based on a first criterion;

generating a second subgraph comprising a second subset of the plurality of contact objects using the matching engine by selecting from the plurality of contact objects based on a second criterion;

wherein the first and second subsets of contact objects at least partially overlap;

intersecting the first and second subsets using the matching engine to generate an intersecting set of contact objects comprising first and second contact objects; and analyzing the first and second contact objects from the intersecting set using the matching engine to determine if the first and second contact objects match; and deleting the second contact object from the contact database if the second contact object matches the first contact object.

10. The method of claim 9, wherein the step of analyzing further comprises:

comparing first and second location attributes of the first and second contact objects from the intersecting set, respectively, using the matching engine to determine a geographical distance between the first and second location attributes; and associating a group identifier with each of the first and second contact objects if the geographical distance is less than a threshold distance.

11. The method of claim 9, wherein the first criterion is a first name, and the second criterion is a surname.

12. The method of claim 9, wherein the step of intersecting the first and second sub graphs further comprises intersecting the first and second sub graphs using the matching engine to generate first and second intersecting sets, and wherein the step of analyzing further comprises analyzing contact objects within each of the first and second intersecting sets to determine if a contact object in each of the first and second intersecting sets matches another contact objects of the same intersecting set.

13. The method of claim 12, wherein the step of analyzing further comprises:

comparing location attributes of the contact objects within each of the intersecting sets using the matching engine to determine a geographical distance between contact objects within each of the intersecting sets; and associating a group identifier with at least two contact objects in the first or second intersecting set if the geographical distance is less than a threshold distance.

* * * * *